United States Patent [19]

Worsley et al.

[11] Patent Number: 4,939,676

[45] Date of Patent: Jul. 3, 1990

[54] MONITORING SHEET LENGTH

[75] Inventors: David R. Worsley; Trevor J. Conner, both of Hampshire, England

[73] Assignee: De La Rue Systems Ltd., England

[21] Appl. No.: 231,080

[22] Filed: Aug. 11, 1988

Related U.S. Application Data

[62] Division of Ser. No. 873,369, Jun. 12, 1986, Pat. No. 4,849,915.

[30] Foreign Application Priority Data

Jun. 17, 1985 [GB] United Kingdom ................ 8515272

[51] Int. Cl.$^5$ ...................... G06F 15/46; B65H 43/08
[52] U.S. Cl. .................................... 364/562; 364/471; 377/8; 340/674; 271/258; 271/261; 235/376
[58] Field of Search .......................... 364/550, 560–563, 364/464.01, 471; 340/674; 356/383, 384; 377/24, 8; 235/7 A, 33, 35, 375, 376; 271/258, 259, 261

[56] References Cited

U.S. PATENT DOCUMENTS 3,936,665  2/1976  Donoghue ........................ 364/563
4,623,975 11/1986  Kagami ............................. 364/560
4,849,915  7/1989  Worsley et al. ................... 364/562

Primary Examiner—Parshotam S. Lall
Assistant Examiner—Brian M. Mattson
Attorney, Agent, or Firm—Ostrolenk, Faber, Gerb & Soffen

[57] ABSTRACT

A method monitors the length of sheets, such as banknotes, passing a predetermined position. The length of a sheet is monitored at two laterally spaced locations, and the difference between the monitored lengths is compared. If the difference is small, this indicates that both monitored lengths are an accurate indication of the length of the sheet. An average of the two monitored lengths is determined and compared with at least one predetermined reference value to determine the acceptability of the sheet. If the average falls within a predetermined range, the sheet is acceptable.

11 Claims, 3 Drawing Sheets

MONITORING SHEET LENGTH

RELATED INVENTIONS

This is a divisional application of U.S. patent application Ser. No. 873,369, filed June 12, 1986, now U.S. Pat. No. 4,849,915, issued July 18, 1989 and entitled Monitoring Sheet Length.

FIELD OF THE INVENTION

The invention relates to methods and apparatus for detecting the acceptability of sheets.

There is a requirement, particularly in the case of document accepting (for example, banknotes and sorting) to determine accurately the length of sheets in order, in the case of banknotes, to distinguish between genuine and fraudulent notes and between genuine notes of different denomination. Previously, known equipment has monitored the length of sheet, but has been unable to handle skew fed sheets in the like.

It should be understood that in the specification the term "length" means the dimension of a sheet in the direction of movement of the sheet. In practice, this dimension may not be the longest dimension of the sheet.

SUMMARY OF THE INVENTION

In accordance with the present invention, a method of detecting the acceptability of sheets comprises:
(a) monitoring a length of a sheet at two laterally spaced positions;
(b) determining a difference between the monitored lengths;
(c) comparing the difference with a predetermined threshold to determine the magnitude of the difference and;
(d)
  (i) if the difference is exceeds a threshold value comparing each monitored length with a first set of at least one predetermined reference value to determine an acceptability of the sheet; or
  (ii) if the difference is is less than said threshold value, determining the average of the two lengths, and comparing the average with a second set of at least one predetermined reference value to determine the acceptability of the sheet.

This method enables not only skew fed sheets to be accepted if they are genuine but also sheets which have cuts, tears, holes and the like.

Step (a) preferably comprises a method according to the invention claimed in the parent application, U.S. Pat. No. 4,849,915 although the method is applicable to other known methods of monitoring sheet length.

Step (c) may comprise determining the difference to be large if it exceeds the predetermined threshold and otherwise determining the difference to be small.

It will be appreciated that methods according to the invention are particularly applicable to banknote monitoring in, for example, banknote counting or sorting apparatus.

BRIEF DESCRIPTION OF THE DRAWINGS

In order that the invention may be better understood, an embodiment of a banknote feeding system for carrying out methods according to the invention will now be described with reference to the accompanying drawings; in which.

DETAILED DESCRIPTION OF AN EMBODIMENT

Figure 1:
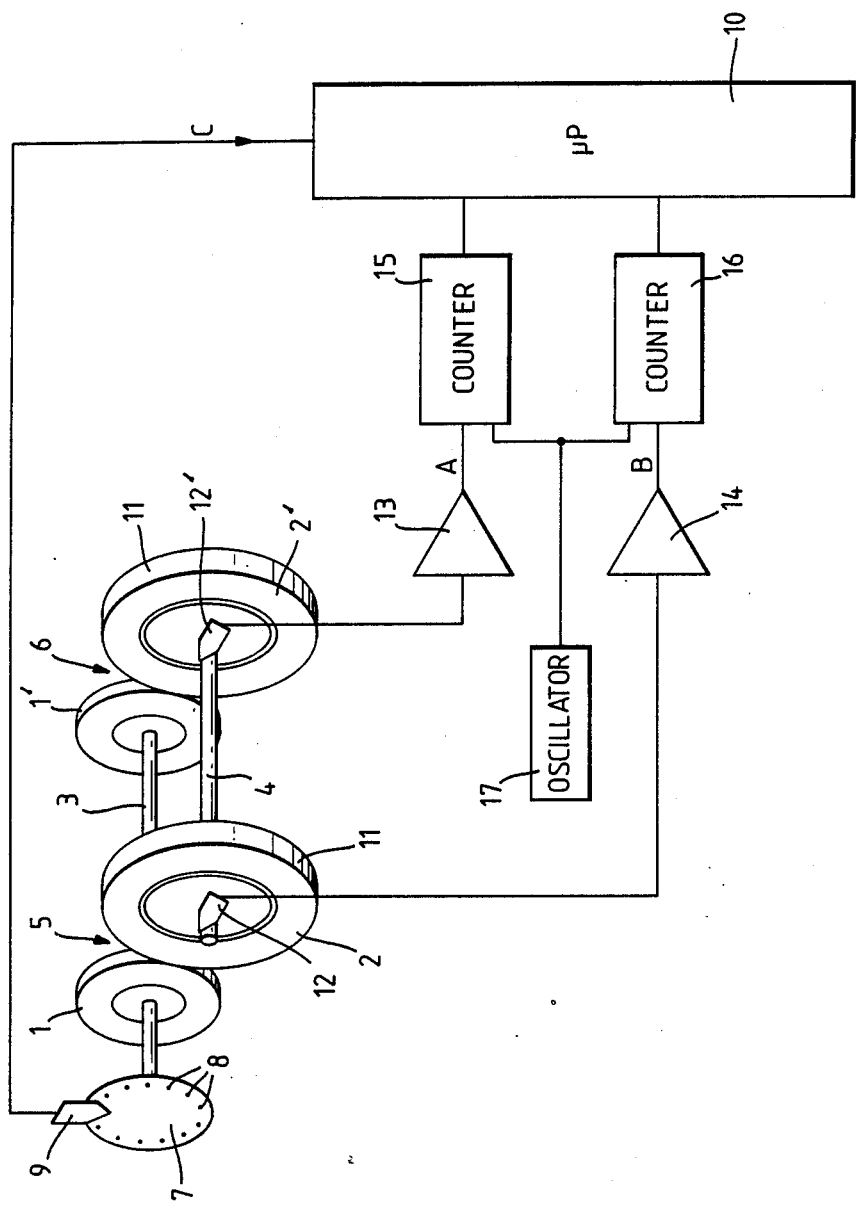
FIG. 1 is a schematic view of the sensing system of the apparatus partly in block diagram form.

The sensing system shown in FIG. 1 comprises two pairs of rollers 1, 1' and 2, 2', respectively. The rollers 1, 1' are non-rotatably mounted on a shaft 3, while the rollers 2, 2' are rotatably mounted on a shaft 4. The rollers 1, 1' and 2, 2' form part of a transport system (not shown) for transporting single sheets from a hopper to a stacking position in order to count the number of sheets in the hopper. An example of such a counting system is described in more detail in the copending European patent application mentioned above and is incorporated in the De La Rue 2300 banknote counting machine. Each pair of rollers 1, 2 and 1', 2', respectively, defines a respective nip 5, 6. A slotted timing wheel 7 of conventional form is non-rotatably mounted to an extension of the shaft 3. The slots 8 of the wheel 7 are equally, circumferentially spaced around the wheel 7 and the light emitting diode and transistor of a detector 9 are positioned on either side of the wheel 7. Output signals (C) from the detector 9 are fed to a microprocessor 10 such as an INTEL 8040.

When a banknote enters the nips 5, 6 this will cause radial movement of rotatable portions 11 of the rollers 2, 2'. This movement will be detected by detectors 12, 12' mounted in the shaft 4 each of which provides a corresponding output signal which is fed to amplifiers 13, 14 respectively. The output signals (A,B) from the amplifiers 13, 14 are fed to enabling inputs of respective counters 15, 16. An oscillator 17 generates a substantially constant high pulse rate output signal (e.g. 21 MHz) which is fed to each of the counters 15, 16. When the counters 15, 16 are enabled by the respective signals A, B, they are incremented at the rate of the pulse signal from the oscillator 17.

When no sheet is present in the nips 5, 6 first signals are output from the detectors 12 and fed to the amplifiers 13, 14. The amplifiers 13, 14 then generate output signals which disable counters 15, 16. When a banknote enters the nips 5, 6 the detectors 12, 12' issue a second signal (which may in certain cases have zero amplitude) which causes amplifiers 13, 14 to enable the respective counters 15, 16. It should be understood that the amplifiers 13, 14 are chosen to be suitable for causing the respective counters 15, 16 to be enabled when a sheet is detected.

Figure 2:
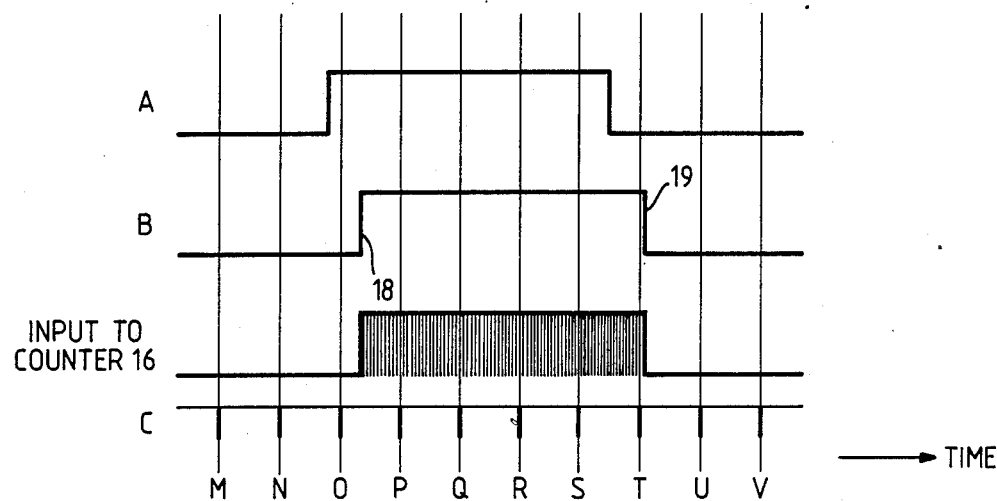
FIG. 2 is a pulse diagram illustrating output signals from the sensing system illustrated in FIG. 1.

FIG. 2 illustrates the case where a banknote is fed slightly skew to the feed direction so that a leading edge of the banknote reaches the nip 6 before the nip 5 is reached. For the sake of example, the situation relative to the nip 5 will be described in more detail. As soon as a banknote is detected in the nip 5, an appropriate signal is fed via the amplifier 14 to the counter 16 to enable the counter. This is indicated by the vertical line 18 in FIG. 2. The counter 16, which has previously been reset to zero, then starts to count pulses received from the oscillator 17.

At the same time, as the rollers 2, 2' rotate, periodic signals (C) are output from the detector 9 to the microprocessor 10 at a rate, for example, of 700 per second. These signals relate to the time intervals during which the rollers 2, 2' have rotated through a fixed angle corresponding to movement of the note through a distance of typically 4.7 mm. Since the slots 8 of the timing wheel 7 are equally spaced this will correspond to equal angles of rotation. (Unequal spacing could also be used with more complex processing). It should be noted that the signals from the detector 9 may not be equally spaced in time if the rollers 2, 2' do not rotate at a constant rate but substantially equal units of length will be transported through the nips between each pair of slots. For convenience, successive signals from the detector 9 over the period concerned are labelled M-V respectively in FIG. 2. In practice a much larger number of intervals will occur between the passage of leading and trailing edges, typically in the order 10–20. It should be noted that the pulse rate delivered by the oscillator 17 is considerably higher than the rate of pulses from the detector 9.

As has previously been explained, as soon as the counter 16 is enabled, it starts to count pulses from the oscillator 17. Thus, at the time P the microprocessor 10 will derive a count value from the counter 16 (and also the counter 15). At this time, the microprocessor 10 also causes the counters 15, 16 to be reset. At the next signal from the detector 9 (Q), the counters 15, 16 are again read (and reset) to determine second count values. It is assumed that the feed rate of the banknote in these two time intervals ending at P and Q is the same so that simply by taking the ratio of the counts read from the counter 16 it is possible to determine what proportion of the interval O-P corresponded to the presence of a note in the nip 5.

At successive signals from the detector 9, the microprocessor 10 reads the counts from the counters 15, 16 and then resets the counters for the next interval. After the signal at time T, the trailing edge of the banknote passes through the nip 5, and the signal B from the detector 12 changes, as indicated by line 19 in FIG. 2, to disable the counter 16. At the time U, the microprocessor 10 reads the count in the counter 16 which will be much smaller than for a fully counted interval such as Q-R. Again, by determining the proportion of the count determined at the time U with the count determined at the time T, a value related to the length of the final portion of the note can be determined.

Since the occurrence of signals Q, R, S and T corresponds to the passage of a certain length of sheet, it is a simple matter to determine the full length of the sheet. For example, if there are X intervals during which a sheet remains in the appropriate nip, for the entire interval then the total length of the sheet may be represented by a value given by the formula:

(P/Q+X+U/T)

where, in this particular example, X=4 and P, Q, U, T represent the counts determined at the end of these intervals. This value can be used as it stands or converted to an actual length if the rotation distance of the circumference 11 of the roller 2 between successive signals from the detector 9 is known.

Figure 3:
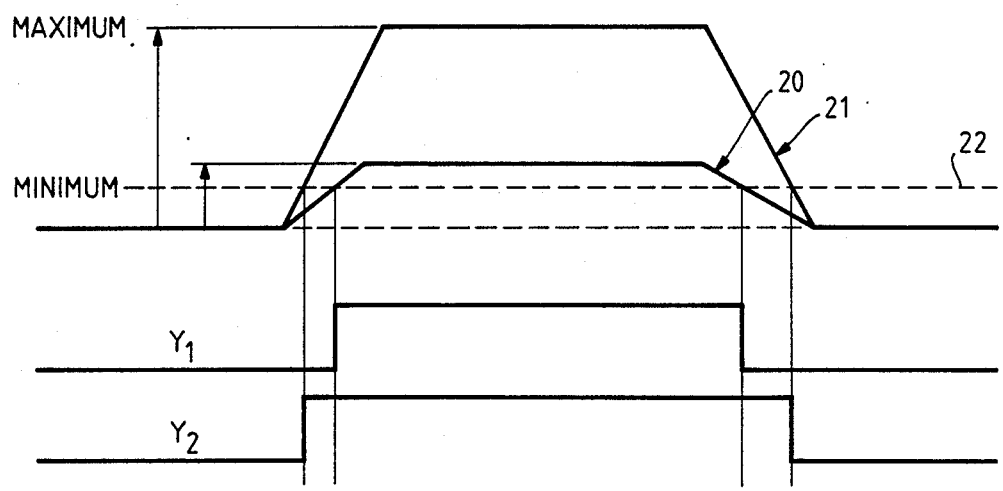
FIG. 3 is a signal diagram illustrating the variation in duration of counter enable signals due to different thickness banknotes.

The length measurement described above can vary by a small amount in accordance with the thickness of the note being fed. FIG. 3 illustrates two examples of the output signal 20, 21 due to the passage of a relatively thin note and a relatively thick note respectively. The presence of a note in the nip is determined by comparing these output signals 20, 21 with a threshold 22 so that a note is only detected when this minimum threshold 22 is exceeded. However, it will be seen that the signal 20 due to a thin note takes longer to exceed the threshold 22 than the signal 21 corresponding to a thick note. This means that the counter enabling signals $Y_1$, $Y_2$ (equivalent to signals A, B in FIGS. 1 and 2) will be generated at different times, as can be seen in FIG. 3, depending upon the thickness of a note. This is, in certain circumstances, undesirable since it will lead to an error in the determination of the length of the note.

To compensate for thickness, it is, therefore, preferred that the microprocessor 10 reduce the calculated length of a banknote having a thickness greater than some minimum thickness, say due to a minimum thickness banknote, in accordance with the following formula:

Compensated length = Measured length $- T_n/K$ where $T_n$ is representative of the thickness of the sheet as determined by the signals from the detector and will lie between certain minimum and maximum values. K is chosen to ensure that the units of $T_n/K$ correspond to the units of "measured length".

In a typical example, the minimum thickness of a sheet which is allowable may be 20 while the maximum allowable thickness is 60, $T_n$ lying between these values and being typically 25. In this example, K is chosen to be 10.

The values of $T_n$ and K depend on the processing equipment used, and K is chosen empirically.

In the case shown in FIG. 2, the banknote is skew fed, and this can be compensated for by using a formula of the form:

True length =

Calculated length $\times$ Cosine $\left( \text{Arctangent} \left( \frac{Ls}{Ld} \right) \right)$

OR

True length =

Calculated length $\times \dfrac{Ld}{\sqrt{Ld^2 + Ls^2}}$ where
Ld = distance between detectors 12 being typically 60 mm.
and Ls = length of skew measurement between left and right detectors 12.

The microprocessor 10 is used to calculate the true length. Note that the true length equals the calculated length when the skew measurement is zero.

The above method forms the basis of the invention described in the parent application hereto. In the method with which this application is concerned, the apparatus shown in FIG. 1 is again used but the microprocessor 10 determines the length of the banknote as separately detected by each detector 12. These lengths $L_1$, $L_2$ are then processed in the following manner.

Figure 4:
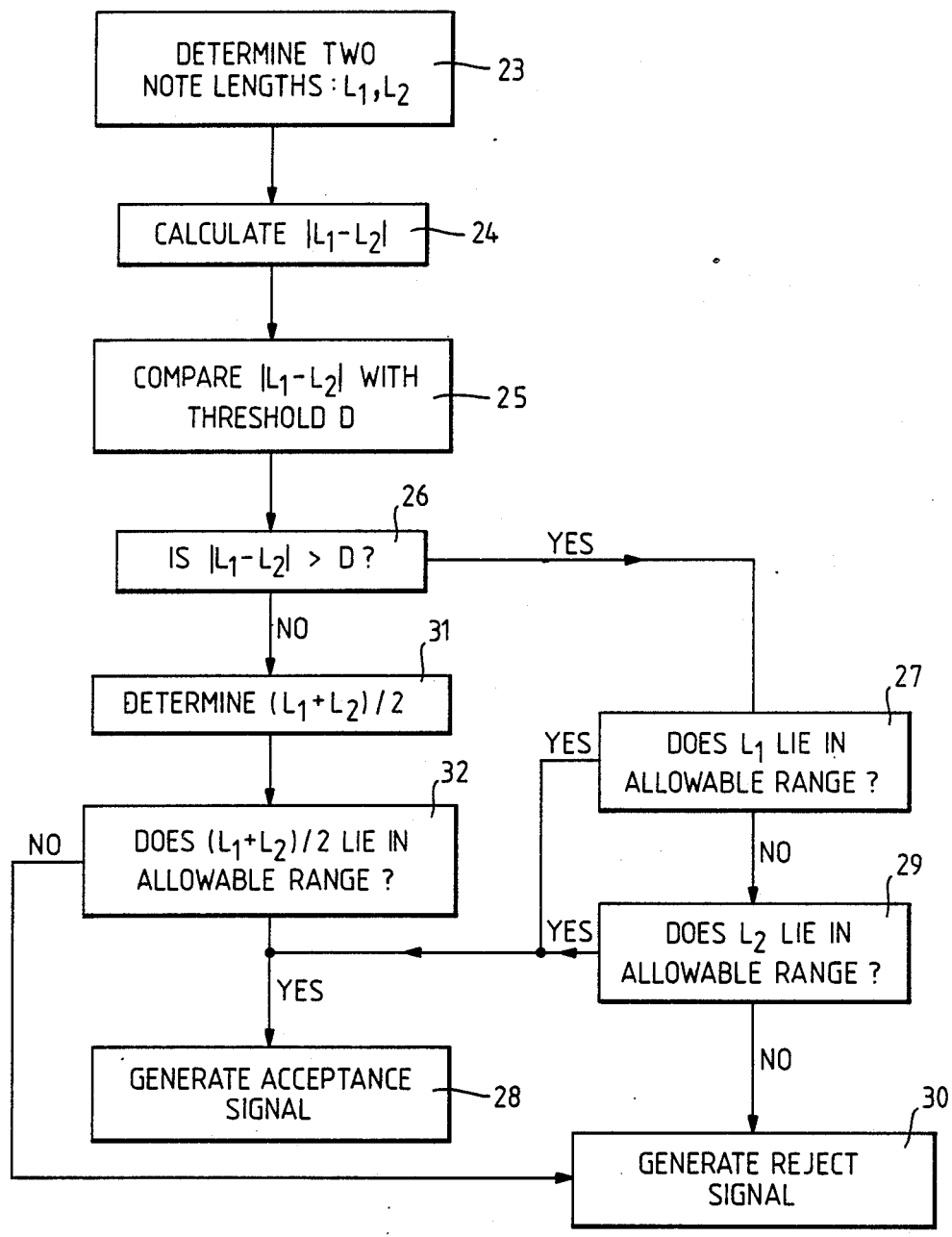
FIG. 4 is a flow diagram illustrating some of the steps carried out by the controlling microprocessor.

FIG. 4 is a flow diagram illustrating part of the operation of the microprocessor.

After the two note lengths $L_1$, $L_2$ have been determined 23, the difference between the two lengths is calculated 24. This difference is then compared with a preset threshold D in a step 25. Typically, in the case of banknotes, D may be set to about 10 mm.

If the difference between the measured note length is greater than D, step 26, this is taken to indicate a banknote part of which is torn, cut, or folded and the like. However, such a banknote may still be a genuine banknote, and the method set out in FIG. 4 provides a way in which the banknote may be accepted despite this apparent difference in note length.

In a step 27, the measured length $L_1$ is compared with an allowable range of lengths which may be defined in terms of a nominal length and a tolerance or, preferably, by upper and lower values. These values may have been preset or previously determined from the first sheet of a batch which is fed through the note counter.

An example of suitable maximum and minimum length limits is 68 mm and 62 mm respectively.

If $L_1$ is found to lie within the allowable range, the microprocessor 10 generates an acceptance signal 28 which may be used to increment a running total of a counter.

If $L_1$ is found not to lie within the allowable range, $L_2$ is compared with the allowable range 29, and a similar acceptance signal is generated if $L_2$ is found to lie within the range.

If, however, both $L_1$ and $L_2$ lie outside the allowable range, then a reject signal is generated 30 by the microprocessor 10. This may be used, for example, to stop the machine to enable the unacceptable note to be extracted.

If, in step 26, the difference between the measured length is found to be less than or equal to the threshold D, the average of the two lengths is determined, 31. This is because the difference may be due to a genuine sheet being fed slightly askew.

The average measured length is then compared with the same allowable range used in step 27 to 29 in a step 32. If the average is found to lie within the range, then the general acceptance signal 28 is generated while if it is outside the range, the reject signal is generated.

Of course, it should be understood that additional tests may be carried out on the banknotes as they are fed so that although the length may be determined to be acceptable, the banknote may still be judged not to be genuine if it fails, for example, an opacity test.

We claim:

1. A method of detecting an acceptability of sheets, said method comprising the steps of:
   (a) monitoring a length of a sheet at two laterally spaced positions;
   (b) determining a difference between said monitored lengths;
   (c) comparing said difference with a predetermined threshold and:
      (i) if said difference exceeds said threshold, comparing each monitored length with a first set of at least one predetermined reference value to determine the acceptability of said sheet; and
      (ii) if said difference is less than said threshold, determining an average of said two lengths, and comparing said average with a second set of at least one predetermined reference value to determine said acceptability of said sheet.

2. The method of claim 1, further comprising the step of generating a signal in accordance with said determination of step (c).

3. The method of claim 1, wherein step (c)(i) determines a sheet to be acceptable if one of said monitored lengths is acceptable.

4. The method of claim 1, wherein said first and second sets of reference values comprise first and second pairs of maximum and minimum length values.

5. The method of claim 4, wherein step (c)(i) comprises determining a sheet to be acceptable if one of said monitored lengths lies in a range defined by said first pair of maximum and minimum length values.

6. The method of claim 4, wherein step (c)(i) comprises determining a sheet to be acceptable if said average lies in a range defined by said second pair of maximum and minimum length values.

7. The method of claim 4, wherein said maximum length values of each pair are identical and said minimum length values of each pair are identical.

8. The method of claim 1, wherein said sheet is a banknote.

9. The method of claim 1, wherein said monitoring step is carried out while said sheet is moved in a first direction along a longest dimension of said sheet and wherein said length is measured along said first direction.

10. The method of claim 1, wherein said length of said sheet is monitored only at said two laterally spaced positions.

11. The method of claim 1, wherein said step (c)(ii) is also performed when said difference between said monitored lengths is equal to said threshold.

* * * * *